Jan. 6, 1959   J. C. NEEDHAM ET AL   2,867,743
ELECTRIC ARC WELDING SYSTEMS
Filed July 6, 1954   4 Sheets-Sheet 4
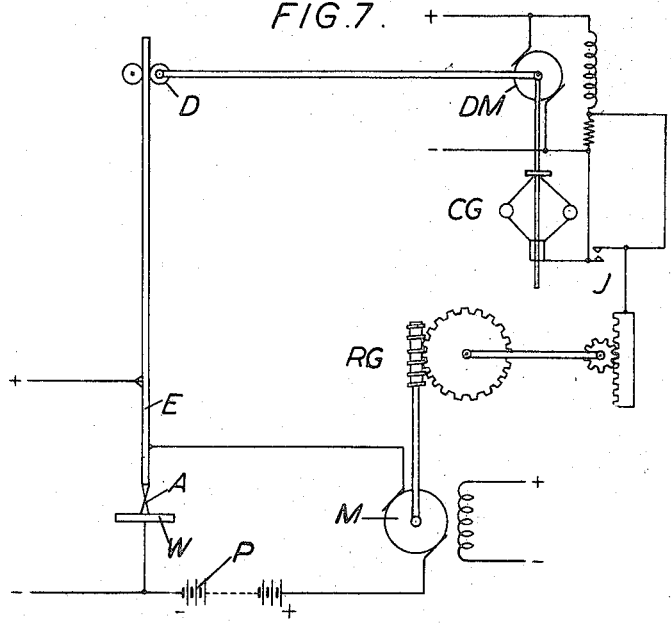
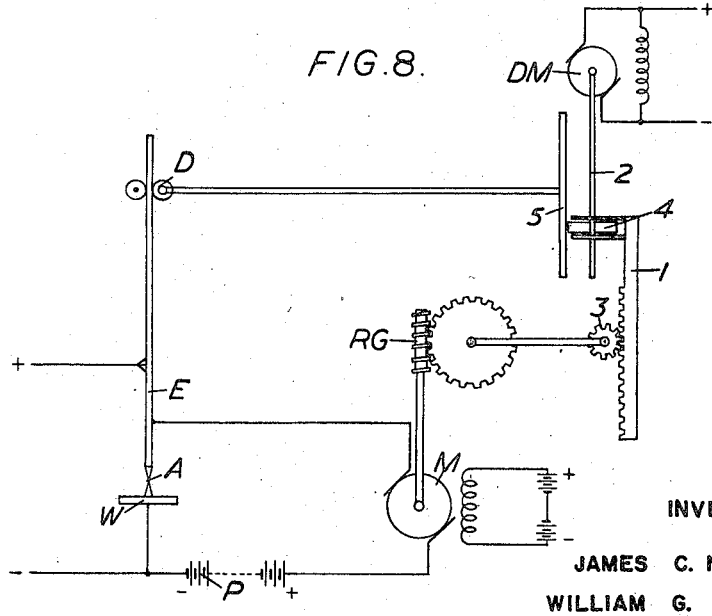
INVENTORS,
JAMES C. NEEDHAM,
WILLIAM G. HULL,
PETER THOMAS HOULDCROFT
By *Ralph B. Stewart*
Attorney United States Patent Office 2,867,743
Patented Jan. 6, 1959

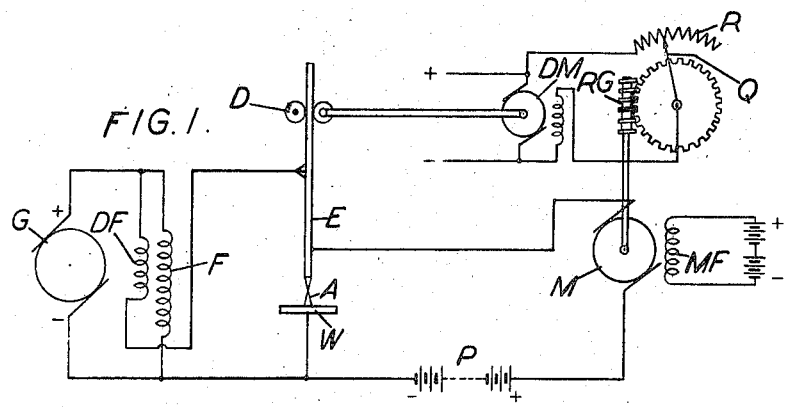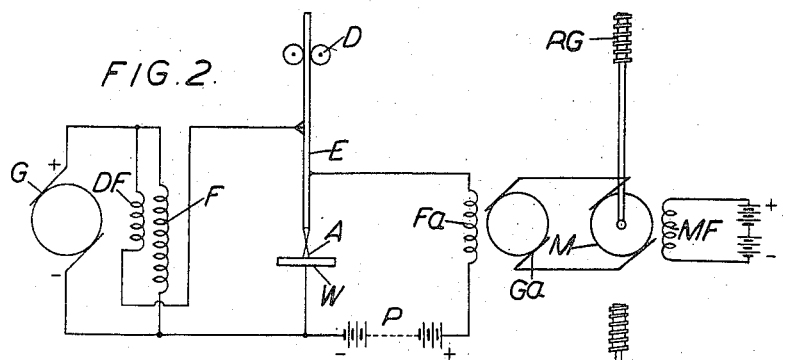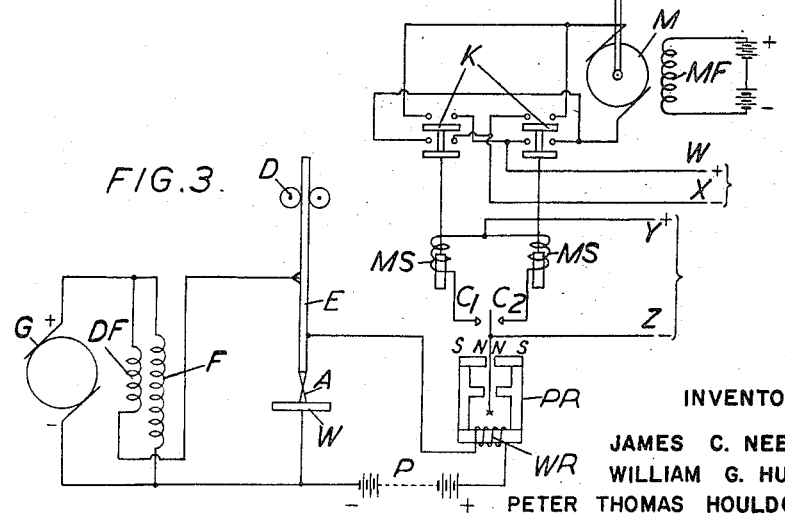

2,867,743

ELECTRIC ARC WELDING SYSTEMS

James Christopher Needham, Greenford, and William Griffin Hull and Peter Thomas Houldcroft, London, England, assignors to E. R. A. Patents Limited, Leatherhead, Surrey, England, a company of Great Britain Application July 6, 1954, Serial No. 441,428

9 Claims. (Cl. 314—75)

This invention relates to electric arc systems and, in fact, to the so-called self-adjusting arc system in which a consumable electrode is fed towards the workpiece at a pre-set or nominally constant rate and is burned or consumed by an arc at such a rate as to maintain the length of the arc substanitally constant. The invention is applicable to both direct current and alternating current systems such as are employed in electric arc welding and cutting.

There are other methods of working with a consumable electrode which is fed towards the work-piece at a rate which is altered or continuously controlled either manually or automatically so as to maintain a given length of arc or voltage across the arc at a given current. In particular, in automatic welding it is the usual practice to arrange for the arc voltage to determine the mean rate of feeding the consumable electrode, it may be after electronic or other amplification, such that an increase in arc voltage resulting from an increase in arc length immediately causes the rate of electrode feed to be increased so that the arc length is reduced to the equilibrium working value and vice versa. The automatic welding system is distinguished from the self-adjusting arc system since the rate of electrode feed is not pre-set but is determined at all times by the arc, and in such automatic systems in order to obtain stability and steady operation, such control has to be effective without excessive hunting within a compartively short period, for example less than one second, since otherwise the length of the arc would be subject to considerable fluctuation.

In the system of working with which the present invention is concerned, the rate of feed of the electrode is pre-set and nominally constant and the maintenance of a given length of arc or arc voltage depends on the control of the rate of burning away of the electrode by the arc. This self-adjusting arc system is described in some detail in British patent application No. 8,289, A. D. 1953, and in British Welding Journal, February 1954, pages 71 to 77. There are two main factors said to give rise to the self-adjustment of the rate of burning away the electrode. The first is that at constant current the rate of consumption of the electrode inherently tends to decrease with increase in arc length and this property is generally ascribed to some change in heating efficiency. The second main factor is that in a given circuit, the increase of arc voltage with increase in arc length tends to reduce the current delivered to the arc and vice versa, arising from the volt-ampere output characteristic of the source of power supply.

The first main factor is, of course, an inherent property of the arc and the degree of self-adjustment of the arc length due to it is not large and its magnitude cannot be changed for a given set-up. The second main factor depends on the relationship of output current to output voltage of the source of power supply; for sources which give approximately constant current the degree of self-adjustment due to this factor is also not high.

Methods of obtaining a high degree of self-adjustment are set out in detal in the said patent application. In this case, the source of power supply is arranged so that upon a relatively small increase in arc length which results in a corresponding increase in arc voltage, the arc current is greatly reduced with a resultant large decrease in the rate of burning away the electrode until the length of the arc is reduced to the working equilibrium value and vice versa.

The arc can be caused to determine the necessary current to be supplied to it by means of a control superposed on the power source of supply, as is set out more fully in patent application Serial No. 441,429, filed July 6, 1954. In that case also the arc voltage and, consequently, the arc length may be arranged to affect the parameters of the main or an auxiliary circuit either directly or indirectly in such a way that an increase in the arc voltage or arc length causes the available arc current to decrease and, consequently, the rate of burning away of the electrode is also decreased until the arc voltage or arc length is reduced to the working equilibrium and vice versa.

As the self-adjusting arc process has been commonly practised hitherto, the power sources employed do not give a large change in arc current for a comparatively small change in arc voltage and, therefore, the degree of overall self-adjustment is not high, that is to say, the change in the rate of burning away the electrode for a given change in arc voltage or arc length is not high. Therefore, the arc length has to change by a comparatively large amount in order to compensate for a relatively small disturbance or change in some other parameter. Such variation in arc length is undesirable. Once the desired equilibrium is established, of course, all the parameters should remain constant or otherwise the arc length would vary appreciably as the degree of self-adjustment commonly occurring is not high. In particular, the parameters should not drift due say to warming up on load or change in voltage of the mains when the supply is derived from a mains source and so forth, since any such drifts result in a corresponding drift in arc length. Such a drift takes place comparatively slowly so that the operator is often not aware of it until it has reached serious amounts.

The main object of the present invention is to provide for a long term change in the rate of electrode feed to correct any drift and other relatively slow changes in the parameters of a system, in which the consumable electrode is fed at a pre-set and nominally constant rate and in which the effective degree of self-adjustment of the system is not high enough to mask such drift. Thus, according to the present invention, in such a system, a long term or slowly acting control responsive to any factor which reflects drift or other long term changes in the parameters of the arc but not responsive to disturbances of short duration, is provided to effect alteration of the rate of electrode feed about the pre-set value. In this way, comparatively small percentage change in the pre-set rate of electrode feed is used to maintain equilibrium in spite of drift and like slow changes and thereby the slow acting control assists in keeping the operating arc voltage or arc length constant.

As already indicated, such change in the preset electrode rate of feed is not required in and it is not applicable to systems in which the degree of self-adjustment is high, as described in the said prior British application No. 8,289 A. D. 1953 and in British Welding Journal, February 1954, pages 71 to 77, nor is it required with a method of control as set forth in patent application Serial No. 441,429, because in such a case any drift in parameters of the power supply is automatically corrected and the arc current maintained at the required level for a given rate of feed of the electrode by the employment of a datum or reference system.

The present invention is also clearly distinct from the systems of automatic welding referred to above where the feed of the electrode is not pre-set but is variable from instant to instant in accordance with the rate of burning off of the electrode due to the arc in a power system which delivers approximately constant current. On the other hand in the present invention, the main control or maintenance of arc length from instant to instant is based on the self-adjustment properties of the system about the operating point with a pre-set rate of electrode feed, and the additional long term fine control of that rate to enable the operating equilibrium level or voltage to be maintained automatically over comparatively long periods without the operator resetting the parameters of the system. In other words, the momentary disturbances of the arc length are taken care of by the self-adjustment effect while gradual changes in the equilibrium working point due to drift and other slow changes in the system are compensated for by the present invention by the gradual change in the pre-set rate of electrode feed. Such long term control directly corrects any gradual change in the rate of electrode feed which would otherwise result in a change in the arc, and compensates for gradual changes in the parameters of the power circuit by adjusting the rate of electrode feed to maintain the desired matching with the rate of burning away of the electrode by the arc.

The control of the gradual change in the rate of electrode feed may be derived from any factor which reflects the condition of the arc and, in particular, any factor arising from the departure from the required equilibrium condition. As a possible example, an image of the arc may be projected on to an element sensitive to radiation, such as a photo-electric cell or a bolometer and the output from such element after suitable amplification may be made to actuate a control associated with the rate of electrode feed, such that the latter is increased if the arc length increases beyond a desired amount and vice versa. It is, however, found most convenient to arrange the control to depend on the voltage across the arc, and instead of making the control a function of the absolute magnitude of the arc voltage it is preferred to make it a function of the difference between the arc voltage and some datum or reference potential or its equivalent. In that way a differential control is obtained which reverses when the arc voltage is changing and passes through the value of the datum potential. Then if the arc increases in length which results in an arc voltage greater than the datum, the control operates gradually to increase the rate of the electrode feed and vice versa.

It is also desirable to arrange for the arc voltage to control the change in the pre-set rate of electrode feed indirectly by way of a servo system which makes it possible more easily to introduce the necessary long time constant in the operation, so as to discriminate against the short duration disturbances. Also, in the case of a differential control as just described, the control mechanism would have to respond to a change of one or two volts. Thus, this voltage may be amplified electronically or electro-magnetically before being applied to the actual control mechanism. The same long term constant may be introduced if the control is applied through electronic apparatus or an electro-magnetic device, such as saturable reactors.

The actual control may be effected in various ways, for example if the speed of the electrode feed mechanism is kept correct by a centrifugal governor the long term control may be arranged to operate on that governor. Then again, the control may be arranged to alter the ratio of an infinity variable gearing in the electrode feeding mechanism or it may be arranged to alter the resistance in the circuit of the electric motor for driving that mechanism. Yet again, the control may be applied by way of a differential gear box through which a driving motor drives the electrode feed mechanism by slowly changing the speed of a third member of the differential gearing in dependence on the drift of one of the parameters of the arc.

In order to explain the invention more clearly, certain examples of systems in accordance with the invention as applied to direct current welding systems with the control responsive to the voltage across the arc, will now be more fully described with reference to the accompanying drawings, in which:

Figure 1 is a circuit diagram showing the slow control of the speed of the driving motor of the electro-feed mechanism;

Figure 2 is a similar circuit diagram showing amplification of the difference voltage applied to the control mechanism.

Figure 3 is yet another circuit diagram of a similar system in which the control is effected from the difference voltage through a polarised relay;

Figure 7 is a circuit diagram showing the control arranged to operate on a centrifugal governor;

Figure 8 is a diagram showing the control arranged to change the ratio of an infinitely variable speed gearing;

Figure 4:
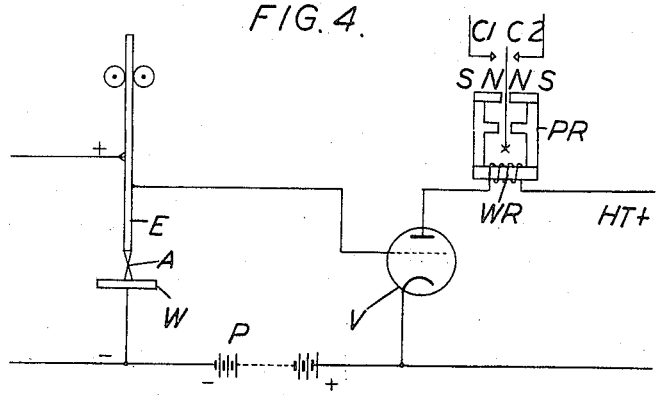
Figure 4 shows a small modification of Figure 3.

In the drawings, the source of power supply is shown as a generator having a drooping volt-current characteristic but it may take other forms such as a transformer-rectifier.

In Figure 1, the source of power supply is a direct current generator G with a main field F and a differentially wound series field winding DF. The work-piece is shown at W and the consumable electrode at E with the arc A struck between them. The feed mechanism for the electrode E is shown generally at D.

In this case, a battery P provides a datum or reference potential connected in opposition to the voltage across the arc A and that difference voltage is applied to a small motor M, the field winding MF of which is shown as independently excited. The motor M remains stationary when the voltage across the arc A is exactly at the datum value, but rotates in one direction or the other as the arc voltage increases or decreases. In the diagram of Figure 1, the motor M is shown driving through considerable reduction gearing RG the arm Q of a field-rheostat R for the electric motor DM, which is the driving motor for the feed mechanism D. It will be seen that owing to the reducing gearing RG the change in speed of the motor DM and, therefore, of the rate of feed of the consumable electrode E takes place very slowly and does not respond at all to ordinary relatively rapid fluctuations in the parameters of the welding circuit.

It is difficult to make the motor M sufficiently sensitive to respond to a small difference voltage and, in Figure 2, while the system is generally the same as in Figure 1 and the same reference characters have been used, a small auxiliary generator Ga has been introduced between the difference voltage afforded by the battery P and that across the arc A and the small motor M. In fact, the difference voltage is applied to the field winding Fa of the generator Ga so that the latter applies a larger voltage to the motor M. Otherwise the system operates in the same way as in Figure 1.

Figure 3 shows an alternative arrangement in which the difference between the voltage across the arc A and that of the battery P is applied to the operating winding WR of a polarised electro-magnetic relay PR which responds to close either its left-hand contact C1 or its right-hand contact C2, depending upon the direction of the current in the winding WR. The contacts C1, C2 control the circuit from a source YZ to two further relays or contactors MS. It will be seen that the contacts of these contactors indicated generally at K, are arranged to reverse the connections from another direct current source WX to the small motor M. The motor M operates as in Figures 1 and 2, except that owing to the action of the relay PR it rotates in either direction with an on-off action.

In Figure 4, the arrangement is similar to that in Figure 3, except that instead of applying the difference voltage direct to the winding WR, that voltage is applied between the grid and cathode of an electronic triode V. Then the anode current of the triode V is passed through the operating winding WR of the polarised relay PR. The rest of the circuit although not shown in detail, is as illustrated in Figure 3.

The relay PR may be magnetically or mechanically biased so that one contact C1 is closed at a low value of the anode current of the valve V, and the other contact C2 at higher current so as to reverse the motor M as in Figure 3. Of course, a spring loaded telephone-type of relay could be employed instead of the polarised relay PR.

Figure 5:
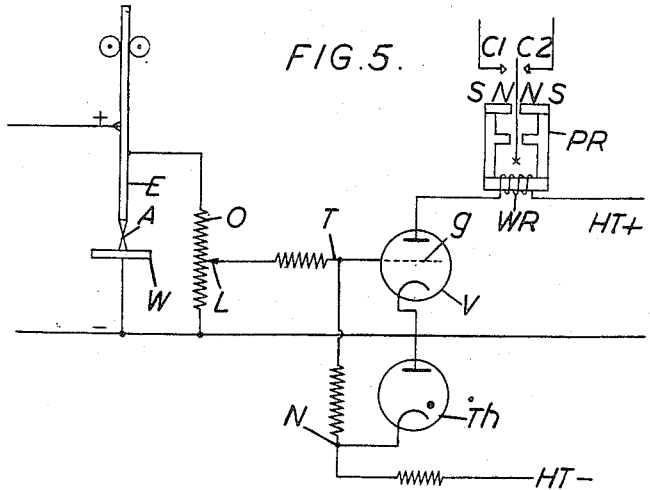
Figure 5 is a circuit diagram of a further small modification of Figure 4.

It will be noted that in Figure 4 the datum potential P is indicated as a grid bias voltage for the triode V, but the datum may be provided in many ways in such electronic circuits, and an example is shown in Figure 5 where the grid $g$ of the triode V is connected to a point T which is between a voltage at a tapping L on a potentiometer O across the arc A and a reference voltage provided by a gas-filled discharge diode $Th$ at N which acts in opposition to the arc voltage in the grid circuit of the valve V.

Figure 6:
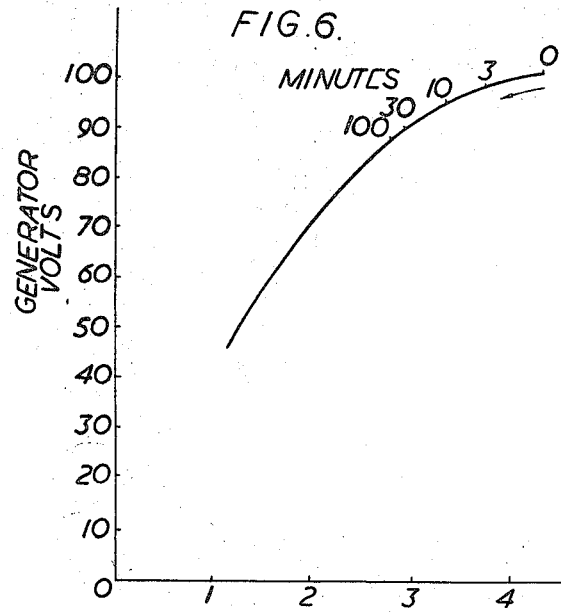
Figure 6 shows an explanatory characteristic curve.

It has been mentioned that the small motor M in each of the examples so far described, is geared down to a very low speed for the contact arm Q to discriminate against disturbances in the arc system of short duration. For example, the motor M could turn the arm Q so that the rate of change of feed of the electrode is less than 15 percent per minute above or below the equilibrium value, so that the control system would not be operative appreciably for a distrubance of a duration small compared with a minute, but would follow up adequate relatively slow changes. To illustrate this, in Figure 6 is shown the open-circuit voltage characteristic of a typical generator G but provided with its own exciting machine, and indicating the change in output voltage with time due to drift in the excitation current as the field winding warms up, where the graduations on the curve are in terms of minutes. The effective time constant of the control system can readily be varied by altering the output speed of the motor M for a given voltage applied to its terminals, and can be made as long or as short as required. The time constant, however, should not be as short as that associated with the self-adjustment properties of the arc, which may be of the order of one second or so. If the time constant of the electrode feed control were much less than that associated with the self-adjustment properties of the arc and the control were of large magnitude, of course, the system would become an automatic welding system of the kind already referred to.

In another modification shown in Figure 7, the speed of the motor DM driving the feed mechanism D for the consumable electrode E, is controlled by a centrifugal governor CG which is driven from the motor DM, and the governor CG is arranged to actuate a pair of contacts J. Thus, the motor M in rotating in one direction or the other raises or lowers one of the pairs of contacts J so that the contacts are closed at a lower or higher speed of the driving motor DM, at which the motor is then maintained. This provides for any alteration necessary in the rate of feed of the electrode E.

In Figure 8 the motor M still drives a pinion 3 at low speed when the arc voltage and the datum potential from the battery P are out of balance, and this results in a change of gear ratio in the infinitely variable speed gearing 4, 5 of the friction edge runner type. The driving motor DM drives the wheel 4 at constant speed as it is raised or lowered and the change in rate of feed of the electrode E results from the change in gearing ratio arising from the friction wheel 4 being shifted further from or nearer to the centre of the driving disc 5.

Figure 9:
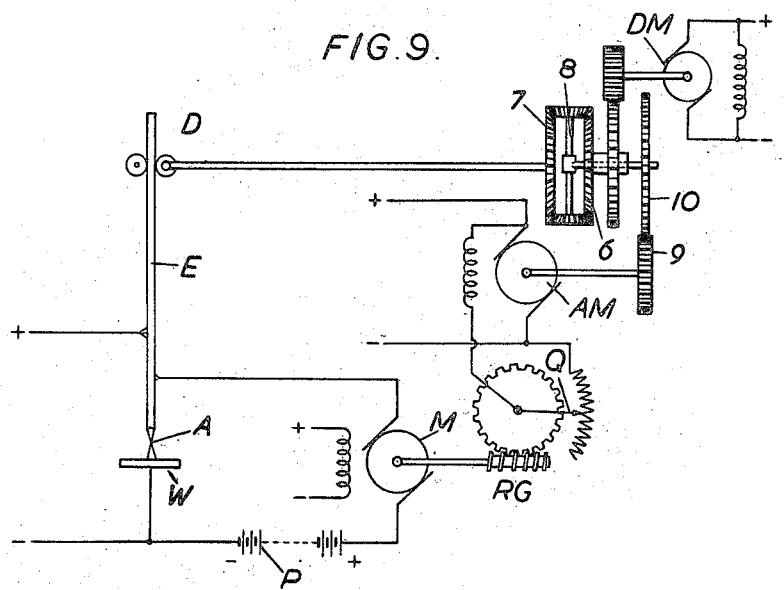
Figure 9 is a circuit diagram of yet another example in whcih a differential gearing is employed.

Finally, in Figure 9, the driving motor DM is geared to one side member 6 of a differential gear box which is illustrated as of the bevel type. The drive of the electrode feeding mechanism D is taken directly from the other side member 7 of the gear box, so that if the planet carrier 8 is held stationary the members 6, 7 rotate at equal speeds in opposite directions. However, it is arranged that the small motor M corresponding to those in the earlier figures slowly alters by means of the reduction gearing RG the speed of an auxiliary motor AM which drives the planet carrier 8, and the speed of the side member 7 is altered accordingly.

Although in all the examples illustrated so far, a direct current system is dealt with, it is clear that for alternating current working similar circuits may be employed, except that the arc voltage in that case is rectified and smoothed before being connected in opposition to the datum potential P.

In the examples also, the control system is shown arranged to vary the rate of feed of the electrode E by direct application to the driving mechanism D, but the factor applied to the mechanism may be applied, for example, through a friction drive, to any manually-operated parameter which governs the rate of feed of the electrode E so that the rate of feed may be pre-set by the operator quite freely, and then left to be gradually altered if required by the arc in accordance with the present invention.

Various modifications of the arrangements of the invention described above may be made. For example, it is generally convenient to arrange for the control to be inoperative except during actual arcing so that it is not operated by the open-circuit voltage of the power source or by zero voltage when the power source is disconnected. Thus the input of the control system or of the circuit of the small motor or both may be arranged to be completed only when an arc is present, for example, by means of a relay system set to operate only at normal arc voltages and not at zero or open-circuit voltages, or by a relay operated by the circuit current.

Such a gradual control of the rate of electrode feed by the arc according to the invention has other advantages, apart from assisting in maintaining equilibrium of arc length in spite of drift in the circuit parameters. Thus the control system permits remote control of arc length and consequently of arc voltage by adjusting the datum or reference voltage. Also, by switching on the small motor M separately, the control system allows remote control of the rate of electrode feed which can thus be altered as desired.

Again, the control system can be arranged to maintain equilibrium, by altering the rate of electrode feed, while the power source output is being changed, either manually or by means of some independent automatic or servo control, to operate at a higher current for example; or similarly, the control system can be used to adjust the rate of electrode feed to match the output of the power source after it has been changed.

If the power source output is accurately fixed or controlled, for example, by one of the methods given in patent application Serial No. 441,429, whereby the arc voltage is used to control the current supplied to the arc, then the control according to this present invention can be used to control or prevent drift in the rate of electrode feed. Thus the deviation in rate of feed from that desired is used to effect a control such that the rate of electrode feed is returned to the desired equilibrium. In this case, the rectified and smoothed output, for example from a small generator or electrical tachometer, which is coupled to the electrode feed mechanism or is driven by the electrode itself, would be used instead of the arc voltage as previously and compared with a suitable datum potential, and the error used to actuate the control which effects a change in the rate of electrode feed.

The datum or reference voltage used in the invention, although normally considered as fixed in order to establish equilibrium at a given arc voltage, may be made a variable according to the operating points required. Thus, if it is desired to operate at different arc lengths during, say, the welding of a complex structure, then the datum voltage can be arranged to be changed according to the required arc voltages. Similarly, if it is desired to operate at different arc voltages according to the current, then the reference voltage can be made a function of the working current. Thus, when the power output is changed, the control not only alters the rate of electrode feed accordingly, but establishes the balance at the desired change of arc voltage.

Another advantage of the method of control is that, as indicated, the operator need not accurately establish the matching between rate of electrode of feed and the rate of burning off of the arc at the current and voltage desired, since the control effects the matching according to the desired arc voltage or arc length. The circuit current, if not as desired, may be altered manually or automatically, and again the control maintains equilibrium by changing the rate of electrode feed. It is desirable that the control shall pull in as rapidly as possible and thereafter maintain equilibrium without hunting. For this, the change of rate of electrode feed may be arranged to be rapid at first and slower thereafter, or the rate of change may be arranged to be proportional to the error signal.

The control may be arranged by suitable amplification to be very sensitive to changes in arc voltage, but it should only act gradually to avoid clashing with the self-adjusting properties of the arcing process and to avoid hunting. Alternatively, the control may be arranged to act only when the arc voltage falls above or below two limits, but to be inactive within these limits. Thus, in practice it may be found, for example, that welding under given conditions is satisfactory with an arc voltage of from 22 to 24 volts. The control may then be arranged to effect a fairly rapid change in the rate of electrode feed so as to pull in as quickly as possible without excessive hunting if the arc voltage is outside these limits, but to allow the self-adjustment properties of the arc to maintain control within such limits.

Such a gap in the control function assists in eliminating hunting due to a rapid control response and it may be readily introduced, for example, by providing a less sensitive polarised relay such that an appreciable difference between the arc voltage and the datum potential is required to operate it. Alternatively, in effect, two control systems with different datum potentials can be used in turn, depending on whether the control motor M is to be driven in one direction or the other.

We claim:

1. In an electric arc system in which an arc is formed between a consumable electrode and a work-piece, the combination of means for continuously feeding said electrode towards the work-piece at a preset rate to maintain an arc between said electrode and said work-piece, a source of power supply connected to supply said arc and maintain said arc at a self-adjusting length, motive power means responsive to the arc voltage, reduction gearing driven by the motive power means, and means controlled by the reduction gearing for adjusting the speed of the feeding means about the preset rate to move the electrode to change the arc-length at a rate which is slow in comparison to the change of arc-length by the self adjustment of the arc for adjusting the speed of the feeding means about the said preset rate, second movable means responsive to the arc voltage, and high-ratio reduction gearing between said first and second movable means whereby said speed is effectively adjusted only on the occurrence of long-term changes in said arc.

2. A system in accordance with claim 1 having means for detecting said arc voltage comprising an electric circuit connected across the arc to provide an output voltage dependent on the arc voltage, said motive power means being responsive to said output voltage.

3. A system in accordance with claim 1 having means for detecting said arc voltage comprising an electric circuit including a source of datum direct current potential is connected to oppose a voltage dependent on that across the arc, said motive power means being responsive to the difference between the datum potential and the voltage depending on that of said arc.

4. In an electric arc system in which an arc is formed between a consumable electrode and a work-piece, the combination of a first electric motor for continuously feeding said electrode towards the workpiece at a preset rate to maintain an arc between said electrode and said work-piece, a source of power supply connected to supply said arc and maintain said arc at a self-adjusting length, an electric circuit connected across said arc and energized by said arc, a source of datum direct current potential connected in said circuit to oppose the voltage of said arc whereby the output of said circuit depends on the difference between said datum potential and a voltage corresponding to that across said arc, a second electric motor connected to be controlled by said output, and mechanical means controlled by said second motor and connected to adjust, about the said pre-set rate, the rate at which said first motor feeds said electrode towards said workpiece, said mechanical means including reduction gearing whereby said rate is effectively adjusted only on the occurrence of long term changes in said arc.

5. An electric arc system according to claim 4, said electric circuit including a field winding of an electrical generator, said generator being controlled by said output, and connected to control said second motor.

6. An electric arc system according to claim 4, said electric circuit including a winding of a polarized electromagnetic relay, said relay being controlled by said output and controlling said second motor.

7. An electric arc system according to claim 4 and also including a centrifugal governor driven by said first motor for controlling the speed thereof, said mechanical means being connected to adjust the governor.

8. An electric arc system according to claim 4, and also comprising an infinitely variable speed gearing through which said first motor feeds said electrode towards said work-piece, said mechanical means being connected to control the gear ratio of said infinitely variable speed gearing.

9. In an electric arc system in which an arc is formed between a consumable electrode and a work-piece, the combination of a first electric motor for continuously feeding said electrode towards the work-piece at a pre-set rate to maintain an arc between said electrode and said work-piece, a source of power supply connected to supply said arc and maintain said arc at a self-adjusting length, a source of datum direct current potential, a polarized electromagnetic relay having a winding, said source and said winding being connected in series between the electrode and the work-piece with the source opposing the potential of the arc so that the relay is controlled by the difference between the datum potential and a voltage dependent on that of said arc, a first electric circuit controlled by said relay, a second electric motor controlled by said first electric circuit and being moved in one direction when the said difference is positive and in the opposite direction when the said difference is negative, reduction gearing driven by said second motor, a rheostat adjusted by said reduction gearing, and a second electric circuit for supplying said first motor with current, said rheostat being connected in said second circuit to control the speed of said first motor.

References Cited in the file of this patent

UNITED STATES PATENTS

| | | |
|---|---|---|
| 1,392,437 | Morton | Oct. 4, 1921 |
| 1,648,561 | Morton | Nov. 8, 1927 |
| 2,636,102 | Lobosco | Apr. 21, 1953 |

UNITED STATES PATENT OFFICE

CERTIFICATE OF CORRECTION

Patent No. 2,867,743 January 6, 1959

James Christopher Needham et al.

It is hereby certified that error appears in the printed specification of the above numbered patent requiring correction and that the said Letters Patent should read as corrected below.

Column 1, line 18, after "burned" insert -- away --; column 8, line 3, beginning with "for adjusting" strike out all to and including "movable means", in line 6, same column.

Signed and sealed this 1st day of September 1959.

(SEAL)

Attest:
KARL H. AXLINE
Attesting Officer

ROBERT C. WATSO
Commissioner of Paten